United States Patent
Im et al.

(10) Patent No.: US 10,466,997 B2
(45) Date of Patent: Nov. 5, 2019

(54) APPARATUS AND METHOD FOR MODIFYING APPLICATION

(71) Applicant: SAMSUNG SDS CO., LTD., Seoul (KR)

(72) Inventors: Dae-Hyuck Im, Seoul (KR); Jong-Gurl Moon, Seoul (KR); Dong-Moon Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/858,334

(22) Filed: Dec. 29, 2017

(65) Prior Publication Data

US 2018/0189051 A1    Jul. 5, 2018

(30) Foreign Application Priority Data

Jan. 3, 2017    (KR) .................. 10-2017-0000527

(51) Int. Cl.
| | |
|---|---|
| G06F 8/65 | (2018.01) |
| G06F 8/70 | (2018.01) |
| G06F 9/445 | (2018.01) |
| G06F 21/54 | (2013.01) |
| G06F 21/44 | (2013.01) |

(52) U.S. Cl.
CPC .............. *G06F 8/65* (2013.01); *G06F 8/70* (2013.01); *G06F 9/44521* (2013.01); *G06F 21/54* (2013.01); *G06F 21/44* (2013.01)

(58) Field of Classification Search
CPC . G06F 21/54; G06F 21/44; G06F 8/70; G06F 9/44521; G06F 8/65
USPC ........................................................ 717/169
See application file for complete search history.

(56) References Cited

U.S. PATENT DOCUMENTS

| | | | | |
|---|---|---|---|---|
| 2005/0251786 | A1* | 11/2005 | Citron | ...................... G06F 8/34 717/106 |
| 2014/0149968 | A1* | 5/2014 | Lee | ..................... G06F 11/3466 717/130 |
| 2016/0134991 | A1* | 5/2016 | Lee | ........................ H04W 12/04 455/419 |
| 2016/0275019 | A1* | 9/2016 | Nam | ....................... G06F 21/53 |
| 2016/0291952 | A1* | 10/2016 | Velasco | ..................... G06F 8/61 |

* cited by examiner

*Primary Examiner* — John Q Chavis
(74) *Attorney, Agent, or Firm* — Sughrue Mion, PLLC

(57) ABSTRACT

An apparatus and method for modifying an application are provided. The method for modifying an application according to one embodiment of the present disclosure includes: decomposing an original application; adding a dynamic library to the decomposed application; and inserting information about the dynamic library into an application executable area of the decomposed application.

12 Claims, 7 Drawing Sheets

FIG. 2

| | 200 | |
|---|---|---|
| 202 | Mach-O binary || 
| 204 | _CodeSignature | archived-expanded-entitlements.xcent | 206
| 208 | embedded.mobileprovision | en.lproj | 210
| 212 | Info.plist | PkgInfo | 214

APPARATUS AND METHOD FOR MODIFYING APPLICATION

CROSS-REFERENCE TO RELATED APPLICATION(S)

This application claims the benefit under 35 USC § 119(a) of Korean Patent Application No. 10-2017-0000527, filed on Jan. 3, 2017, in the Korean Intellectual Property Office, the entire disclosure of which is incorporated herein by reference for all purposes.

BACKGROUND

1. Field

The following description relates to an application modification technology.

2. Description of Related Art

Enterprise mobility management (EMM) is one of the enterprise mobile security solutions that encompass functions of mobile device management (MDM) and mobile application management (MAM). In particular, as the use of mobile terminals has recently become common practice, mobile trends, such as bring your own device (BYOD) which allows individual employees to use their personal terminals for business purpose, and company-issued, personal enabled (COPE) which allows designated terminals provided by a company to be used for business and personal use, are spreading.

However, as the personal terminals are used for both business and personal purposes, concerns about corporate confidentiality are increasing. There is also a growing demand for dynamically controlling enterprise applications, such as e-mail, instant messaging, and in-house systems required for business, in addition to hardware control functions, such as WiFi of a terminal, camera control, GPS control, and communication control.

In order to control enterprise applications in conjunction with EMM, the enterprise applications must be created separately using API provided by EMM. However, in this case, various existing enterprise applications must be re-created based on EMM, resulting in cost and time problems. Therefore, there is a need for a method for effectively modifying an application to include additional functions such as EMM, without separately creating an existing enterprise application.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for modifying an application to additionally include a desired policy and functions in an existing application.

In one general aspect, there is provided a method performed by a computing device including one or more processors and a memory in which one or more programs executed by the one or more processors are stored, the method comprising: decomposing an original application; adding a dynamic library to the decomposed application, the dynamic library regarding a function or a policy; inserting information about the dynamic library into an application executable area of the decomposed application; and generating a modified application comprising the dynamic library and the information about the dynamic library, so that the modified application comprises the function or the policy that is not in the original application.

The inserting the information about the dynamic library may comprise inserting the information about the dynamic library into a load command area of an architecture of the decomposed application.

The inserting the information about the dynamic library may further comprise: obtaining start address and size information of the architecture from a header of the application executable area; searching for header information of the architecture using the start address and the size information and calculating therefrom a last position of the load command area in the architecture; inserting the information about the dynamic library into the calculated last position of the load command area; and updating header information of the architecture to correspond to the inserted information about the dynamic library.

The method may further comprise updating the start address and the size information of the architecture in the header of the application executable area.

The method may further comprise, re-generating application signature information, wherein the modified application further comprises the re-generated application signature information.

The re-generating of the application signature information may comprise: replacing a provisioning profile of the original application; modifying entitlement information of the original application; generating the re-generated application signature information using the replaced provisioning profile and the modified entitlement information; and replacing an application signature information of the original application with the re-generated application signature information.

The method may further comprise, extracting an information area of the original application from the decomposed application and changing a bundle identifier (ID) of the original application in the information area.

The method may further comprise extracting an information area of the original application from the decomposed original application and replacing an icon file of the original application in the information area.

In another general aspect, there is provided an apparatus for modifying an application, comprising: at least one processor configured to implement: an inputter configured to receive an original application; an application decomposer configured to decompose the original application; an application modifier configured to add a dynamic library to the decomposed application, the dynamic library relating to a function or a policy, and insert information about the dynamic library into an application executable area of the decomposed application; and a modified application generator configured to generate a modified application comprising the dynamic library and the information about the dynamic library, so that the modified application comprises the function or the policy that is not in the original application.

The application modifier may be further configured to insert the information about the dynamic library into a load command area of an architecture of the decomposed application.

The application modifier may be further configured to: obtain start address and size information of the architecture from a header of the application executable area; search for header information of the architecture using the start address and the size information and calculating therefrom a last position of the load command area in the architecture; insert the information about the dynamic library into the calculated last position of the load command area of the architecture; and update header information of the architecture to correspond to the inserted information about the dynamic library.

The application modifier may be further configured to update the start address and the size information of the architecture in the header of the application executable area.

The apparatus may further comprise an application re-signer configured to re-generate application signature information wherein the modified application further comprises the re-generated application signature information.

The application re-signer may be further configured to: replace a provisioning profile of the original application; modify entitlement information of the original application; generate the re-generated application signature information using the replaced provisioning profile and the modified entitlement information; and replace an application signature information of the original application with the re-generated application signature information.

The apparatus may further comprise a bundle ID modifier configured to extract an information area of the original application from the decomposed application and change a bundle ID of the original application in the information area.

The apparatus may further comprise an icon replacer configured to extract an information area of the original application from the decomposed original application and replace an icon file of the original application in the information area.

Other features and aspects will be apparent from the following detailed description, the drawings, and the claims.

BRIEF DESCRIPTION OF THE DRAWINGS

FIG. 2 is a diagram for describing a file format of an iOS application.

Figure 1:
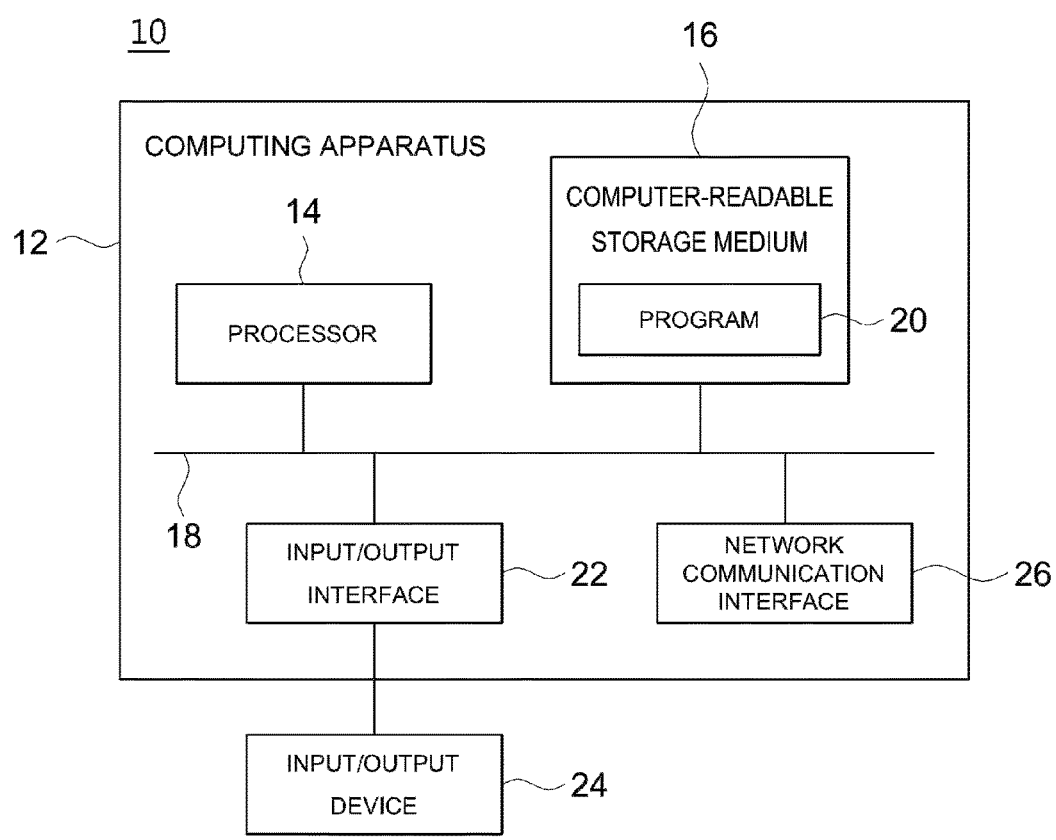
FIG. 1 is a block diagram for describing a computing environment including a computing device suitable for use in illustrative embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram for describing a computing environment including a computing device suitable for use in illustrative embodiments. In the illustrated embodiments, components each may provide different functions and capabilities as well as the functions and capabilities described herein, and extra components may be included in addition to those described below.

The illustrated computing environment 10 includes a computing device 12. In one embodiment, the computing device 12 may be an apparatus for modifying an application according to embodiments of the present disclosure. The computing device 12 includes at least one processor 14, a computer-readable storage medium 16, and a communication bus 18. The processor 14 may cause the computing device 12 to operate in accordance with the aforementioned illustrative embodiments. For example, the processor 14 may execute one or more programs 20 stored in the computer-readable storage medium 16. The one or more programs may include one or more computer-executable instructions, which, when executed by the processor 14, cause the computing device 12 to perform operations in accordance with the illustrative embodiments.

The computer-readable storage medium 16 is configured to store computer-executable instructions, program code, program data, and/or other suitable forms of information. The program 20 stored in the computer-readable storage medium 16 includes a set of instructions executable by the processor 14. In one embodiment, the computer-readable storage medium 16 may be memory (volatile memory, such as random access memory (RAM), non-volatile memory, or any suitable combination thereof), one or more magnetic disc storage devices, optical disk storage devices, flash memory devices, and other forms of storage media accessible by the computing device 12 and capable of storing desired information, or any suitable combination thereof.

The communication bus 18 interconnects other components of the computing device 12 including the processor 14 and the computer-readable storage medium 16.

The computing device 12 may include one or more input/output interfaces 22 configured to provide interfaces for one or more input/output devices, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (a mouse, a trackpad, or the like), a keyboard, a touch input device (a touchpad, a touch screen, or the like), a voice or sound input device, an input device, such as a variety of sensor devices and/or an image capturing device, and/or an output device, such as a display device, a printer, a speaker and/or a network card. The exemplary input/output device 24 may be included in the computing device 12 as one component constituting the computing device 12, or may be connected to the computing device 12 as an independent device separate from the computing device 12.

The computing device 12 in accordance with the embodiments of the present disclosure is an apparatus for modifying an original application by adding an additional function or policy to the original application. The computing device 12 according to the embodiments of the present disclosure may be used to add a security function, such as enterprise mobility management (EMM), to an enterprise application developed without considering a security function. In this case, a company or the like can easily create an enterprise application having a security function without newly re-creating the currently used application. However, the embodiments of the present disclosure are not limited to a specific use, such as the security as described above, and may be applicable without limitation in applying various additional functions or policies to the original application.

In the embodiments of the present disclosure, the computing device 12 may be configured to decompose the original application to be modified, add a dynamic library thereto, insert information related to the dynamic library into an application executable area of the decomposed original application, and then reconstruct the decomposed original application to create a modified application. In the embodiments of the present disclosure, the dynamic library refers to a library in which program code related to the additional function to be added to the original application is included. For example, when the additional function relates to the EMM, the dynamic library may include program code for executing the EMM-related function. For instance, the dynamic library may allow the application to store data not in an application directory, but in a predetermined secure storage. In addition, in another example, the dynamic library may include a function to control hardware included in the computing device 12, such as a camera of the computing device 12. In this case, the dynamic library may detect an access of the application to a camera function, identify a current location of the computing device 12, and allow the access to the camera function only when the computing device 12 is not located within a predetermined security zone (such as within a specific building). Further, the dynamic library may receive and store security policy information required for execution of the above-described security function from a remote policy server (not shown) through a network.

Meanwhile, the application according to the embodiments of the present disclosure is configured to include executable code and additional data (execution environment, authority, certificate, additional content, etc.) related to the executable code. In the following description, embodiments of the present disclosure will be described based on an iOS application format (IPA file format) developed by Apple for convenience of description. However, it should be noted that the embodiments of the present disclosure are not limited to a specific type of file format FIG. 2 is a diagram for describing a file format 200 of an iOS application. An iOS application is a file with an extension of .ipa, which is compressed in zip format. As shown in FIG. 2, the iOS application includes seven areas. Functions of each area are described as below.

An application executable area 202 is an area in which executable code of the iOS application is included, and is a binary in Mach-O executable file format.

_CodeSignature 204 is a folder containing signature information of the iOS application. The iOS application is protected using code signature. Code signature is a type of hash value for an iOS application, which is generated when the iOS application is packaged. An installation daemon of iOS, installd, verifies integrity of the iOS application by comparing a signature calculated by the installation daemon itself and a signature stored in the _CodeSignature 204 when the application is installed. Hence, if even a single byte is changed after the iOS application has been packaged, the iOS application fails to pass integrity verification and thus the installation is blocked by installd.

archived-expanded-entitlements.xcent 206 is a file in xml format which contains information about functions or entitlements supported by the iOS application. For example, when the iOS application uses a specific function of iOS (e.g., push notification, iCloud, etc.), information related to the specific function is stored in this file.

embedded.mobileprovision 208 is an area in which a provisioning profile for signing the iOS application is stored.

en.lproj 210 is a folder containing a complied resource file of the iOS application.

Info.plist 212 is a file in xml format which contains information of the iOS application. For example, the Info.plist may contain a bundle identifier (ID) and icon file information of the iOS application.

Pkginfo 214 is a file containing information about creation, package type, and the like of the iOS application.

Figure 3:
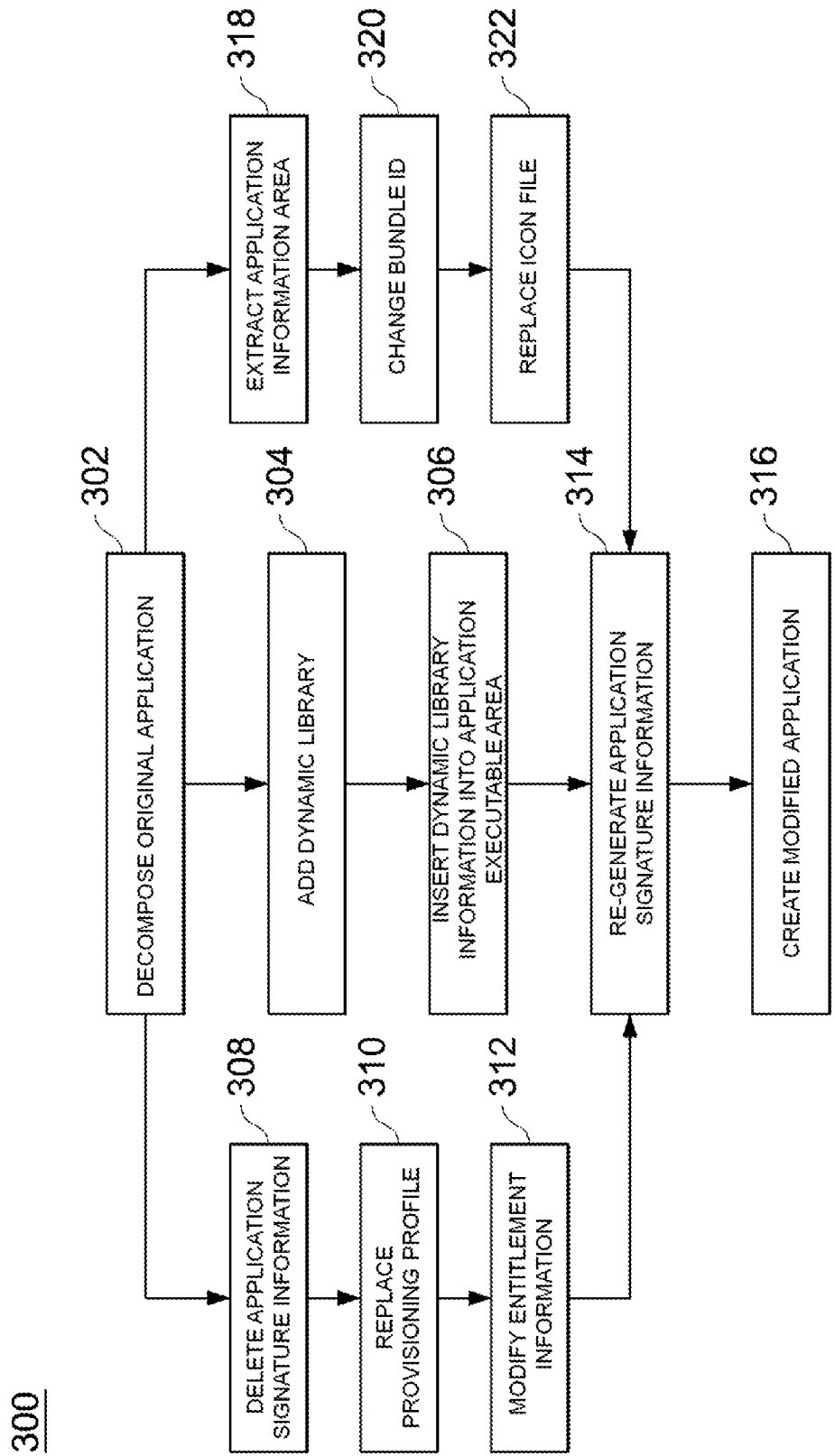
FIG. 3 is a flowchart for describing a method 300 of modifying an application according to one embodiment of the present disclosure.

FIG. 3 is a flowchart for describing a method 300 of modifying an application according to one embodiment of the present disclosure. The method shown in FIG. 3 may be performed by, for example, a computing device which includes one or more processors and a memory storing one or more programs executed by the one or more processors. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added and performed.

In operation 302, the computing device 12 decomposes an original application. For example, in the case in which the original application is an IPA file, the computing device 12 may decompose the IPA file by decompressing the original application and obtain folders and files as described in FIG. 2 from the IPA file.

In operation 304, the computing device 12 adds a dynamic library to the decomposed application. In one embodiment, the dynamic library may be in the form of a file. In this case, the computing device 12 may add the dynamic library to the original application by copying the dynamic library to the same folder as a folder in which each file and folder of the original application decompressed in operation 302.

In operation 306, the computing device 12 inserts dynamic library information into an application executable area of the decomposed application. In one embodiment, the computing device 12 may be configured to insert the dynamic library information into a load command area of each of one or more architectures constituting the original application, which will be described in more detail below.

Figure 4:
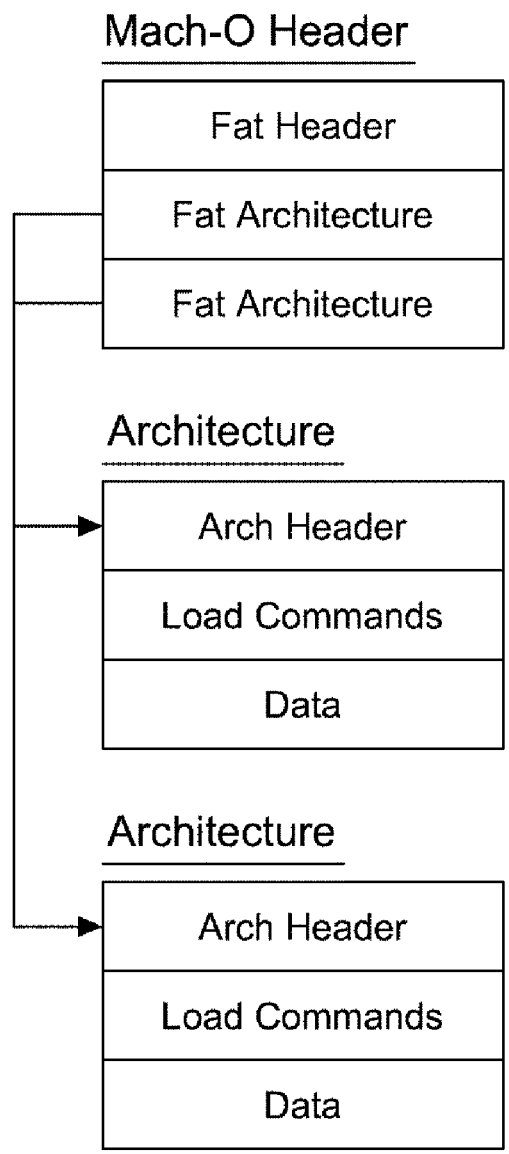
FIG. 4 is an exemplary diagram for describing a detailed configuration of an application executable area according to one embodiment of the present disclosure.

FIG. 4 is an exemplary diagram for describing a detailed configuration of the application executable area 202 according to one embodiment of the present disclosure. The application executable area 202 according to one embodiment of the present disclosure has a binary file structure and be capable of recognizing the structure and encryption of the file through parsing of the file. As illustrated, the application executable area 202 according to one embodiment of the present disclosure includes an executable area header (Mach-O header) and one or more architectures. In the illustrated embodiment, two architectures are included, but the embodiments of the present disclosure are not limited to a specified number of architectures.

The Mach-O header includes a Fat header and one or more Fat architectures. The Fat header contains information on the number of architectures (nfat_arch) included in the executable area 202. In addition, there are a number of Fat architectures corresponding to the number of the aforesaid nfat_arch, and a start address (offset) and size information of each of the architectures is stored. In operation 306, the computing device 12 may identify the start address and the total size of each architecture using the offset and the size stored in the Fat architecture.

Then, the computing device 12 moves to a start address of each of the architectures using the above-described offset information. As shown in FIG. 4, each of the architectures is divided into an architecture header (Arch Header), a load command area, and a data area. The architecture header is an area in which information related to a corresponding architecture is stored, the load command area is an area in which information of a command to be executed at the time of driving a corresponding architecture is stored, and the data area is an area in which data necessary for driving a corresponding architecture. In one embodiment of the present disclosure, the dynamic library information is stored in the load command area of each of the architectures, so that program code included in the dynamic library which is added at the time of driving a corresponding architecture is executed together.

First, the computing device 12 searches the architecture header of a corresponding architecture and identifies the number of load commands (ncmds) included in the load command area and the size of the load command area (sizeofcmds). Then, the computing device 12 moves to the last address of the load command area using the sizeofcmds information and inserts the dynamic library information immediately behind the existing load command area. In this case, the data area of a corresponding architecture is move by a size of the inserted dynamic library information.

Figure 5:
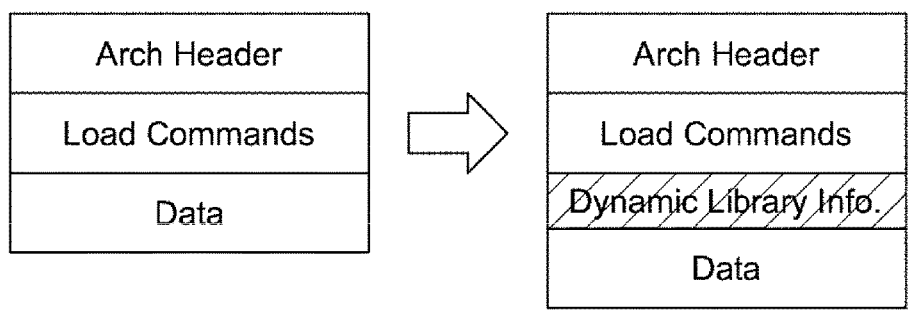
FIG. 5 is an exemplary diagram for describing a process of inserting dynamic library information into the application executable area according to one embodiment of the present disclosure.

FIG. 5 is an exemplary diagram for describing a process of inserting the dynamic library information into the application executable area 202 according to one embodiment of the present disclosure. In the embodiments of the present disclosure, the dynamic library information to be inserted into the load command area may be a name, a version, a storage path of the dynamic library added in operation 304.

Once the library information is inserted, the computing device 12 updates ncmds and sizeofcmds of the architecture header in consideration of the size of the inserted dynamic library information. In addition, when the total size of a corresponding architecture is changed due to the insertion of the library information, the computing device 12 updates offset and size values of each of the architectures of the Mach-O header by taking into consideration the size change. The above processes are repeatedly performed for all architectures included in a Mach-O header.

Meanwhile, the computing device 12 may be configured to verify whether or not the original application is forged or falsified by analyzing information (name, path information, etc.) of load commands pre-existing in each of the load command areas, in the process of inserting the dynamic library information into each of the architectures.

Then, in operation 308, the computing device 12 deletes signature information of the original application. As described above, the signature information of the iOS application is stored in the _CodeSignature area 204. In the embodiments of the present disclosure, the original application is changed by adding the dynamic library and information related thereto to the original application, and thus it is not possible to install the iOS application with the existing signature information which has been generated on the basis of the original application. Therefore, in the present process, the existing signature information of the original application is deleted prior to creating new signature information.

In operation 310, the computing device 12 deletes a provisioning profile pre-stored in the embedded.mobileprovision 208, and stores a new provisioning profile for signing the application.

In operation 312, the computing device 12 modifies entitlement information stored in the archived-expanded-entitlements.xcent, so that the modified application can have a function or entitlement necessary for using the added dynamic library.

In operation 314, the computing device 12 re-generates application signature information by taking into consideration the changes occurring in the above-described operations, and stores the signature information in the _CodeSignature area 204. That is, the re-generated signature information replaces the previous signature information deleted in operation 308 with the re-generated signature information.

In operation 316, the computing device 120 re-compresses the decomposed files and folders to create a modified application in IPA file format. In this case, the modified application includes the above-described dynamic library and the re-generated application signature information.

Meanwhile, the method 300 of modifying an application according to one embodiment of the present disclosure may further include an operation of changing a bundle ID and icon of the original application. The operation of changing the bundle ID and icon of the original application may be performed after operation 302, and may be performed concurrently with the above-described operations 304 to 312, or performed prior to or after operations 304 to 312. The operation of changing the bundle ID and icon of the original application will be described as below.

In operation 318, the computing device 12 extracts an information area of the original application from the original application decomposed in operation 302. For example, in the case where the original application is an IPA file, the information area may be an Info.plist file.

In operation 320, the computing device 12 changes the bundle ID of the original application in the information area. In the case of an iOS application, applications with the same bundle ID are not redundantly installed in a terminal. Therefore, when a bundle ID of a modified application is changed as in the embodiment of the present disclosure, it is possible to simultaneously use a non-modified application (i.e., original application) and the modified application. For example, in the case of the same e-mail application, a non-modified, original application may be used for personal use and a modified application may be used for business use.

In operation 322, the computing device 12 replaces an icon file of the original application in the information area with an icon file for the modified application. When the icon of the modified application is changed as in the embodiment of the present disclosure, a user is able to visually distinguish each application in an environment in which the non-modified application and the modified application are simultaneously installed.

When the bundle ID and icon file of the application are changed through the above-described processes, signature information is re-generated by reflecting all the changes in operation 314. In addition, either or both of the above-described operations 320 and 322 may be performed according to necessity, or both operations may not be performed when the bundle ID and icon change is not required.

Figure 6:
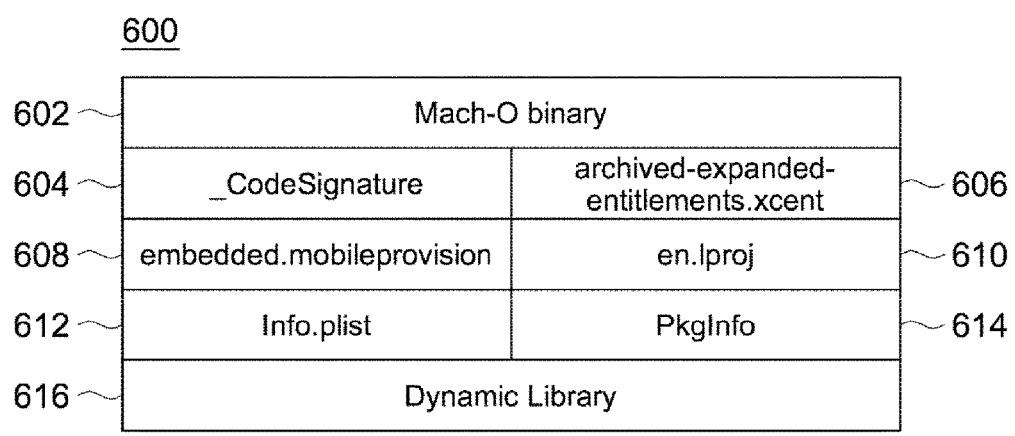
FIG. 6 is an exemplary diagram for describing a structure of an application modified according to the embodiments of the present disclosure.

FIG. 6 is an exemplary diagram for describing a structure of an application 600 modified through the above-described processes. It can be seen that a dynamic library 616 is added to the modified application unlike the original application shown in FIG. 2. In addition, as described above, information about a dynamic library 616 is inserted into a Mach-O binary 602, and _CodeSignature 604, archived-expanded-entitlements.xcent 606, embedded.mobileprovision 608, and PkgInfo 614 are additionally modified.

Figure 7:
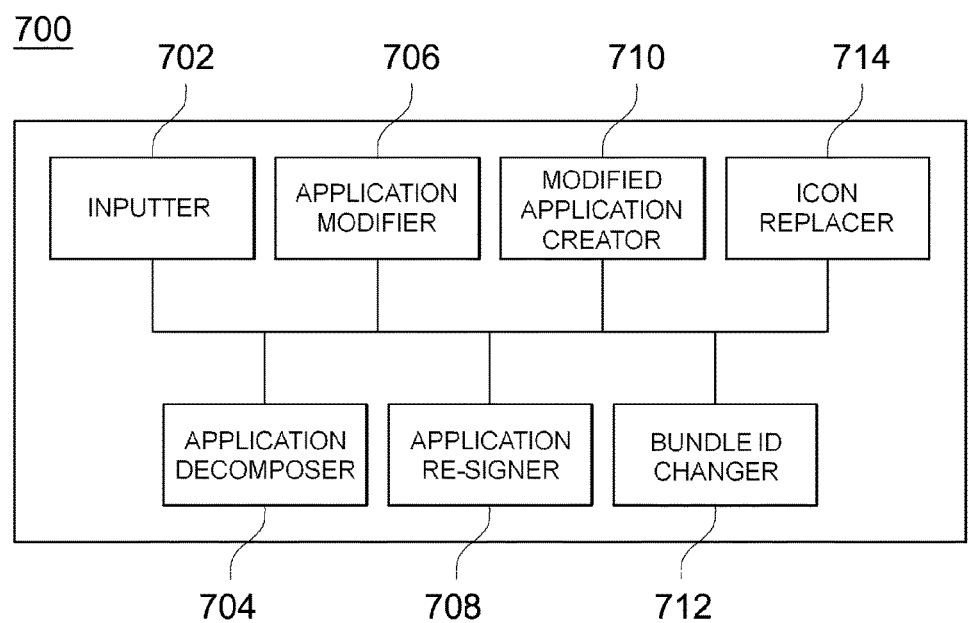
FIG. 7 is a block diagram for describing an apparatus for modifying an application according to one embodiment of the present disclosure.

FIG. 7 is a block diagram for describing an apparatus 700 for modifying an application according to one embodiment of the present disclosure. As shown in FIG. 7, the apparatus 700 for modifying an application according to one embodiment of the present disclosure includes an inputter 702, an application decomposer 704, and an application modifier 706.

The inputter 702 receives an original application to be modified.

The application decomposer 704 decomposes the received original application.

The application modifier 706 adds a dynamic library to the decomposed application and inserts information about the dynamic library into an application executable area of the decomposed application.

In one embodiment, the application modifier 706 may insert the dynamic library information into a load command area of each of one or more architectures constituting the original application. Specifically, the application modifier 706 may obtain a start address and size information of each of the one or more architectures from a header (Mach-O header) of the application executable area and search header (mach_header) information of each of the one or more architectures using corresponding start address and size information. In addition, the application modifier 706 may calculate the last position of the load command area of each of the architectures from the searched information, insert the dynamic library information into the calculated last position of the load command area of each of the architectures, and update header information of each of the architecture to correspond to the inserted dynamic library information. After updating the header information of each of the architectures, the application modifier 706 may update the start address and size information of each of the architectures which are included in the header (Mach-O header) of the application executable area.

Meanwhile, the apparatus 700 for modifying an application according to one embodiment of the present disclosure may further include an application re-signer 708 and a modified application creator 710.

The application re-signer 708 re-generates signature information of the application modified by the application modifier 706. Specifically, the application re-signer 708 may replace a provision profile of the original application with another provision profile, modify entitlement information of the original application, generate the signature information using the replaced provisioning profile and the modified entitlement information, and replace the signature information of the original application with the generated signature information.

The modified application creator 710 may create a modified application which includes the application signature information and the application executable area to which the dynamic library information is added.

In addition, the apparatus 700 for modifying an application according to one embodiment of the present disclosure may further include a bundle ID changer 712 and an icon replacer 714.

The bundle ID changer 712 extracts an information area of the original application from the decomposed application, and changes a bundle ID of the original application in the information area.

The icon replacer 716 extracts an information area of the original application from the decomposed application, and replaces an icon file of the original application in the information area.

According to the embodiments of the present disclosure, it is possible to effectively modify an application into a security-enhanced application which meets the purpose, such as EMM, while minimizing application source code modification.

In addition, according to the embodiments of the present disclosure, it is possible to simultaneously install a non-modified application and a modified application in the same computing device by changing the icon of the application at the time of modifying the application.

Moreover, according to the embodiments of the present disclosure, it is possible to allow a user to visually recognize whether the application is modified or not by changing an icon of the application when the application is modified.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method performed by a computing device including one or more processors and a memory in which one or more programs executed by the one or more processors are stored, the method comprising:
   decomposing an original application;
   adding a dynamic library to the decomposed application, the dynamic library regarding a function or a policy;
   inserting information about the dynamic library into an application executable area of the decomposed application;
   re-generating application signature information; and
   generating a modified application comprising the re-generated application signature information, the dynamic library and the information about the dynamic library, so that the modified application comprises the function or the policy that is not in the original application,
   wherein the re-generating of the application signature information comprises:
      replacing a provisioning profile of the original application;
      modifying entitlement information of the original application;
      generating the re-generated application signature information using the replaced provisioning profile and the modified entitlement information; and
      replacing application signature information of the original application with the re-generated application signature information.

2. The method of claim 1, wherein the inserting the information about the dynamic library comprises inserting the information about the dynamic library into a load command area of an architecture of the decomposed application.

3. The method of claim 2, wherein the inserting the information about the dynamic library further comprises:
   obtaining a start address and size information of the architecture from a header of the application executable area;
   searching for header information of the architecture using the start address and the size information and calculating therefrom a last position of the load command area in the architecture;
   inserting the information about the dynamic library into the calculated last position of the load command area; and
   updating header information of the architecture to correspond to the inserted information about the dynamic library.

4. The method of claim 3, further comprising, updating the start address and the size information of the architecture in the header of the application executable area.

5. The method of claim 1, further comprising:
   extracting an information area of the original application from the decomposed application; and
   changing a bundle identifier (ID) of the original application in the information area.

6. The method of claim 1, further comprising:
   extracting an information area of the original application from the decomposed original application; and
   replacing an icon file of the original application in the information area.

7. An apparatus for modifying an application, comprising:
   at least one processor configured to implement:
      an inputter configured to receive an original application;
      an application decomposer configured to decompose the original application;
      an application re-signer configured to re-generate application signature information;
      an application modifier configured to add a dynamic library to the decomposed application, the dynamic library relating to a function or a policy, and insert information about the dynamic library into an application executable area of the decomposed application; and
      a modified application generator configured to generate a modified application comprising the re-generated application signature information, the dynamic library and the information about the dynamic library, so that the modified application comprises the function or the policy that is not in the original application,
   wherein the application re-signer is further configured to:
      replace a provisioning profile of the original application;
      modify entitlement information of the original application;
      generate the re-generated application signature information using the replaced provisioning profile and the modified entitlement information; and
      replace application signature information of the original application with the re-generated application signature information.

8. The apparatus of claim 7, wherein the application modifier is further configured to insert the information about the dynamic library into a load command area of an architecture of the decomposed application.

9. The apparatus of claim 8, wherein the application modifier is further configured to:
   obtain a start address and size information of the architecture from a header of the application executable area;
   search for header information of the architecture using the start address and the size information and calculating therefrom a last position of the load command area in the architecture;
   insert the information about the dynamic library into the calculated last position of the load command area of the architecture; and
   update header information of the architecture to correspond to the inserted information about the dynamic library.

10. The apparatus of claim 9, wherein the application modifier is further configured to update the start address and the size information of the architecture in the header of the application executable area.

11. The apparatus of claim 7, further comprising a bundle ID modifier configured to extract an information area of the original application from the decomposed application and change a bundle ID of the original application in the information area.

12. The apparatus of claim 7, further comprising an icon replacer configured to extract an information area of the original application from the decomposed original application and replace an icon file of the original application in the information area.

* * * * *